(12) United States Patent
Lai

(10) Patent No.: US 7,474,516 B2
(45) Date of Patent: Jan. 6, 2009

(54) ELECTROSTATIC DISCHARGE GUIDE AND LIQUID CRYSTAL DISPLAY UTILIZING SAME

(75) Inventor: Han-Chung Lai, Taoyuan County (TW)

(73) Assignee: AU Optronics Corp., Hsinchu (TW)

( * ) Notice: Subject to any disclaimer, the term of this patent is extended or adjusted under 35 U.S.C. 154(b) by 0 days.

(21) Appl. No.: 11/865,933

(22) Filed: Oct. 2, 2007

(65) Prior Publication Data

US 2008/0024947 A1 Jan. 31, 2008

Related U.S. Application Data

(63) Continuation of application No. 10/875,339, filed on Jun. 24, 2004, now Pat. No. 7,317,602.

(30) Foreign Application Priority Data

Feb. 16, 2004 (TW) .............................. 93103611 A

(51) Int. Cl.
*G02F 1/1333* (2006.01)
(52) U.S. Cl. .......................................... 361/56; 349/40
(58) Field of Classification Search ............ 361/56–58, 361/91.1, 111; 349/40
See application file for complete search history.

(56) References Cited

U.S. PATENT DOCUMENTS

| 5,184,235 A | 2/1993 | Sukegawa |
| 5,233,448 A | 8/1993 | Wu |
| 5,313,319 A | 5/1994 | Salisbury |
| 5,852,480 A | 12/1998 | Yajima et al. |
| 6,534,246 B2 | 3/2003 | Bae |

*Primary Examiner*—Danny Nguyen
(74) *Attorney, Agent, or Firm*—Thomas, Kayden, Horstemeyer & Risley

(57) ABSTRACT

An electrostatic discharge guide comprises a ground wire isolated from a data line. The ground wire has a main ground segment and at least one electrostatic discharge triggering segment connected to the main ground segment.

8 Claims, 5 Drawing Sheets

ELECTROSTATIC DISCHARGE GUIDE AND LIQUID CRYSTAL DISPLAY UTILIZING SAME

CROSS REFERENCE TO RELATED APPILCATIONS

This application is a Continuation application of pending U.S. patent application Ser. No. 10/875,339, filed on Jun. 24, 2004 and entitled "Electrostatic Discharge Guide And Liquid Crystal Display Utilizing Same", incorporated herein by reference.

BACKGROUND OF THE INVENTION

1. Field of the Invention

The invention relates to a liquid crystal display with an electrostatic discharge guide and, in particular, to a liquid crystal display with a structure guiding electrostatic discharge to occur at a specific location.

2. Description of the Related Art

Electrostatic discharge, abbreviated as ESD in the following description, may occur during measurement, assembly, installation, and use in integrated circuits and liquid crystal displays and may damage the circuits or devices therein. Furthermore, function of the entire system may be affected. The three models often explain the causes of ESD stress. The first ESD stress model of the Human Body Model (HBM) refers to ESD stress caused by discharge when a charged human body touches a device under test (DUT). The second ESD stress model of the Machine Model (MM) refers to ESD stress caused by discharge when a charged machine contacts a device under test (DUT). The third ESD stress model of the Charged Device Model (CDM) refers to ESD stress caused by discharge when a charged DUT contacts a conductor which is at a different voltage potential.

In the fabrication process of a thin film transistor liquid crystal display (TFT-LCD), a panel is processed by many machines and operators. Inevitably, electrostatic charge builds up. Electrostatic charge that is not released in some way is harmful to the TFT-LCD. Typically, the Joule heat generated during discharge causes ESD damage to a TFT-LCD. Joule heat may result in a short circuit between two isolated conductors or an open circuit caused by melted conductive wire. Both types of damage may cause the TFT LCD to malfunction.

Damage can be detected by electrical testing subsequent to fabrication of a liquid crystal display. However, TFT-LCD is large devices measured in inches while the physical dimensions of ESD damage is measured in micrometers. Thus rapid determination of location of ESD damage in a large size display and rapid repair thereof are important issues. Overcoming either or both issues can enhance the repair rate and improve yield.

BRIEF SUMMARY OF THE INVENTION

An object of the present invention is to provide a structure for guiding electrostatic discharge to a specific location.

Thus, the present invention provides an ESD guide comprising a ground wire, isolated from a data line, with at least one main ground segment and at least one electrostatic discharge triggering segment connected to the main ground segment.

According to an embodiment of the present invention, the electrostatic discharge triggering segment comprises two ends connected with the main ground segment respectively.

In another embodiment of the present invention, the ground wire further comprises an opening substantially surrounded by the main ground segment and the electrostatic discharge triggering segment and intersecting the data line.

According to another embodiment of the present invention, the electrostatic discharge triggering segment has a first line width and the main ground segment has a second line width. The first line width is smaller than the second line width.

The present invention provides another liquid crystal display with an electrostatic discharge guide. The liquid crystal display comprises a substrate, a plurality of data lines arranged substantially in parallel thereon, and at least one ground wire isolated from and intersecting the data lines to form a plurality of intersecting regions. In each intersecting region, the ground wire comprises at least one main ground segment isolated from and intersecting a corresponding data line and at least an ESD triggering segment, connected to the main ground segment, isolated from a corresponding data line.

In the liquid crystal display with an ESD guide, the ground wires are located between the substrate and each data line or each data line is located between the substrate and the ground wire.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Electrostatic discharge typically occurs at a location where current density is higher and results in an open or short circuit of a data line. To prevent open or short circuits caused by electrostatic discharge at the intersection of a data line and a ground wire, the present invention provides a structure for guiding electrostatic discharge to occur at a specific location. The structure is useful for the repair of data lines and ground wires.

Figure 6:
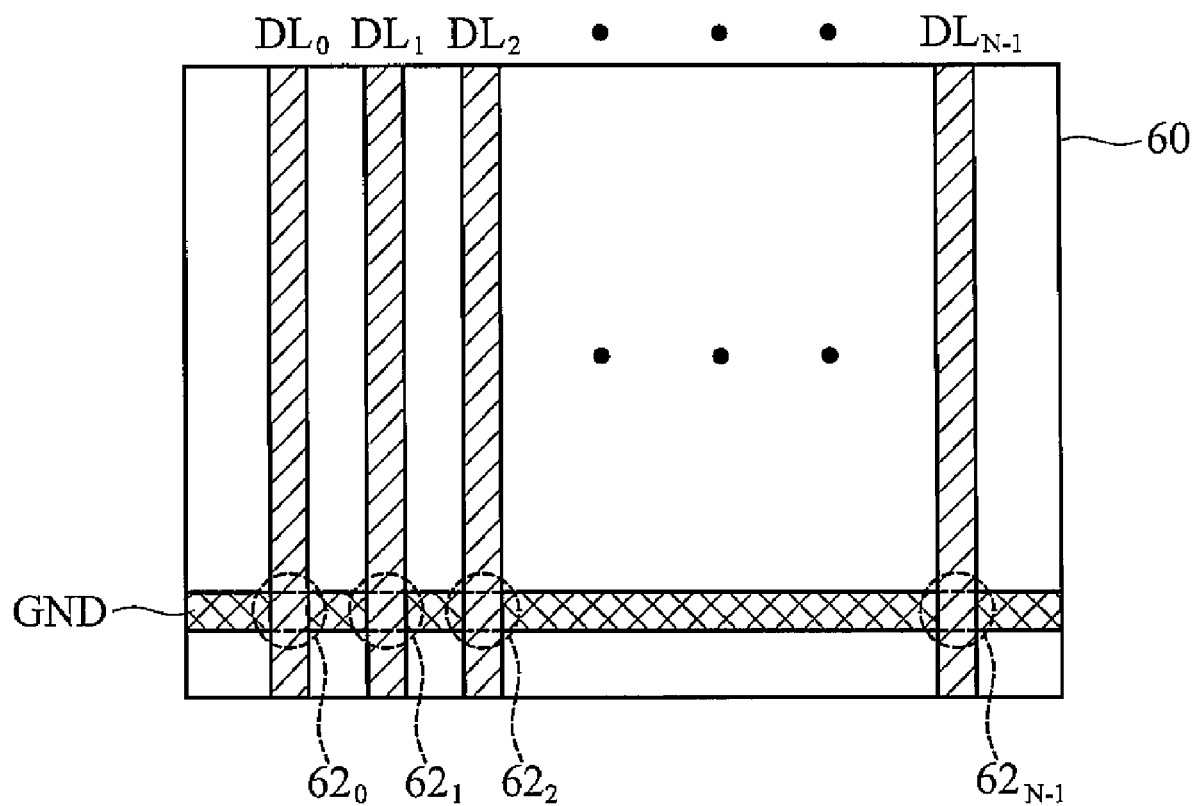
FIG. 6 is a liquid crystal display according to the present invention.

FIG. 6 shows a TFT-LCD according to one embodiment of the present invention. The TFT-LCD comprises a substrate

60, a ground wire GND and data lines $DL_0 \sim DL_{N-1}$. Data lines $DL_0 \sim DL_{N-1}$ are implemented substantially in parallel on the substrate 60. A ground wire GND is also implemented on the substrate 60. From the three dimensional viewpoint, the sequence of the layers are substrate 60, ground wire GND, and data lines $DL_0 \sim DL_{N-1}$. The sequence may alternately be substrate 60, data lines $DL_0 \sim DL_{N-1}$, and ground wire GND.

Ground wire GND and data lines $DL_0 \sim DL_{N-1}$ are isolated and intersected to form a plurality of intersections $62_0 \sim 62_{N-1}$. All intersections are identical. To simplify the description, the structure of the intersection $62_0$ is given as an example. The scope of the invention, however, is not limited by the following explanation.

Figure 1:
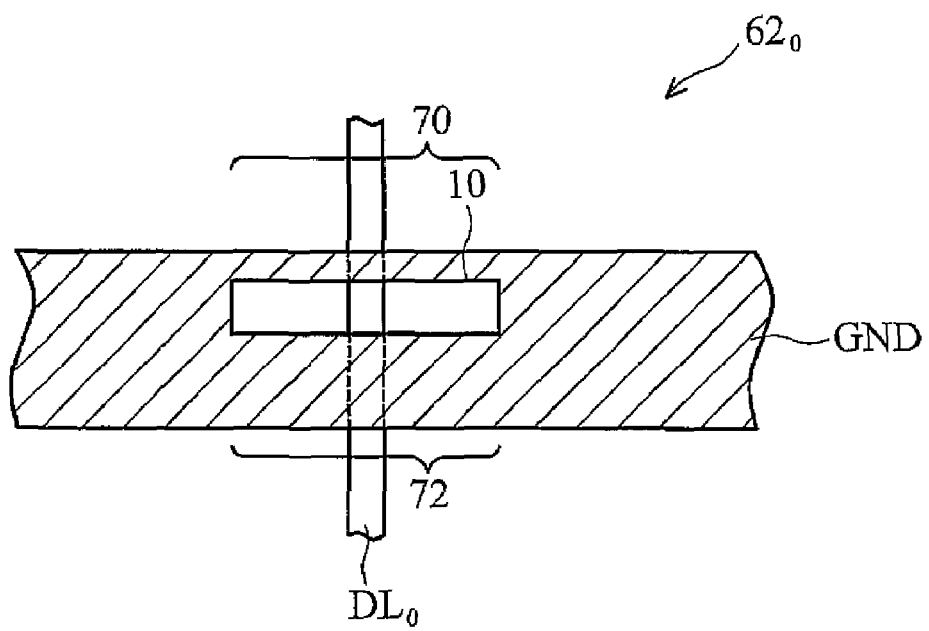
FIG. 1 illustrates the electrostatic discharge guide with the data line located under the ground wire.

Referring to FIG. 1, a data line $DL_0$ is located under a ground wire GND and they are electrically isolated from each other. The ground wire GND has a main ground segment 72 and one electrostatic discharge triggering segment 70 at the intersection of the ground wire GND and the data line $DL_0$. Both ends of the electrostatic discharge triggering segment 70 are connected with the main ground segment 72. Both ends of the electrostatic discharge triggering segment 70 are connected with the main ground segment 72 and are therefore regarded as part of the ground wire GND. The electrostatic discharge triggering segment 70, the main ground segment 72 and the surrounding area form an opening 10 at the intersection of the ground wire GND and the data line $DL_0$.

It is noted that in FIG. 1, the line width of the electrostatic discharge triggering segment 70 is smaller than that of the main ground segment 72. The main advantage of such design is that the ESD current flows through the electrostatic discharge triggering segment 70 instead of the main ground segment 72 when an ESD event discharges through the data line $DL_0$ and the ground wire GND. The method is described in the following.

It is well known that at the equal potential surface of a conductor, the intensity of electric field is directly proportional to the curvature of the surface. Put simply, on the same conductor, the electric field increases with the curvature. Once ESD stress occurs across the data line $DL_0$ and the ground wire GND, breakdown starts from the electrostatic discharge triggering segment 70 because the electric field is higher at the electrostatic discharge triggering segment 70 than at the main ground segment 72. In other words, if there is a first ESD triggering voltage at the electrostatic discharge triggering segment 70 and a second ESD triggering voltage at the main ground segment 72 in FIG. 1, the first ESD triggering voltage is obviously lower than the second ESD triggering voltage. Therefore, the electrostatic discharge is guided to occur at the intersection of the narrower electrostatic discharge triggering segment 70 and the data line $DL_0$. Thus, the ESD current flows through electrostatic discharge triggering segment 70 instead of the main ground segment 72. When ESD damage to the data line $DL_0$ is discovered, the damage can be verified by observing the intersection of the electrostatic discharge triggering segment 70 and the data line $DL_0$.

An ESD event occurring across the data line $DL_0$ and the ground line GND, wherein heat is definitely generated at the intersection of the electrostatic discharge triggering segment 70 and the data line $DL_0$, has three potential results. The first result may be a short between the electrostatic discharge triggering segment 70 and the data line $DL_0$, the second possible result may be meltdown of the electrostatic discharge triggering segment 70, and the third result may be meltdown of the data line $DL_0$ at the intersection. Meltdown of the electrostatic discharge triggering segment 70, however, does not result in circuit malfunction and as such is not addressed. The repairing methods for repairing a short circuit and a melted data line $DL_0$ are described in the following.

Figure 2:
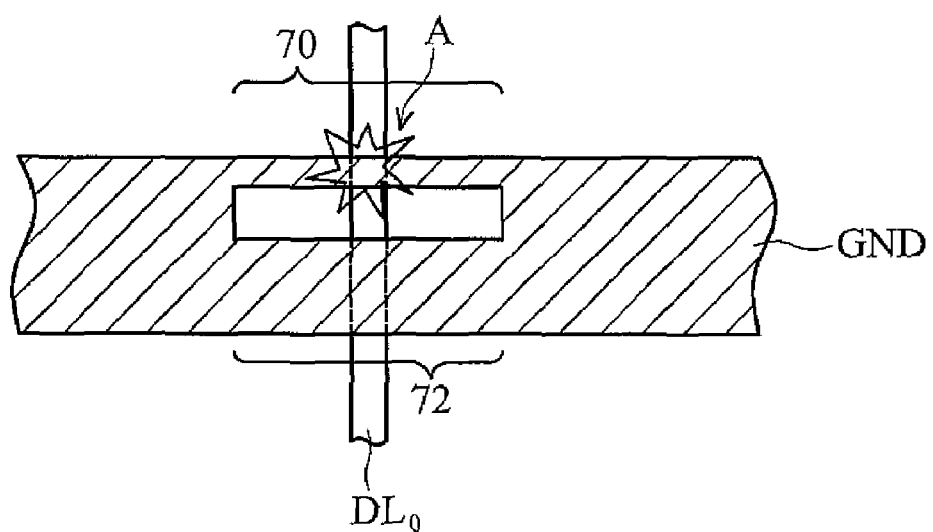
FIG. 2 illustrates a short circuit between a data line and a ground wire when ESD occurs in the electrostatic discharge guide shown in FIG. 1.
Figure 3:
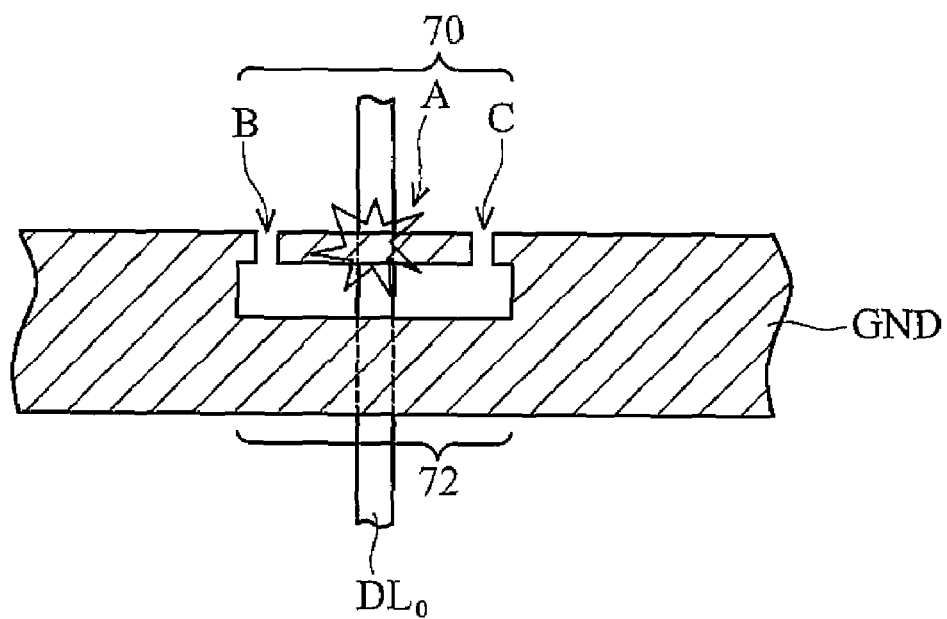
FIG. 3 illustrates the method for repairing the short circuit shown in FIG. 2.

FIG. 2 shows a short between the electrostatic discharge triggering segment 70 and the data line $DL_0$ caused by ESD. The method for repairing the short is illustrated in FIG. 3. The repair is accomplished by disconnecting the ends B and C of the electrostatic discharge triggering segment 70 and the electrostatic discharge triggering segment 70 is thereby disconnected from the ground wire GND. As a result, the data line $DL_0$ is isolated from the ground wire GND. A laser cut can then be utilized to cut a thinner electrostatic discharge triggering segment 70. Further, to ensure that the data line $DL_0$ remains normal, a repair wire can be formed to cross over the defect A to connect both ends of the data line. The repairing method is illustrated in detail in FIGS. 5A and 5B.

Figure 4:
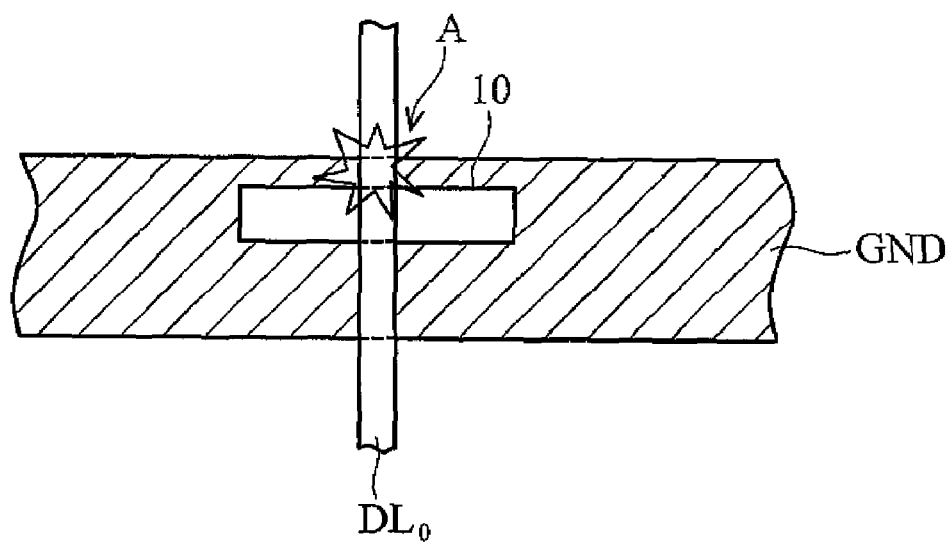
FIG. 4 illustrates an open circuit of a data line when ESD occurs in the electrostatic discharge guide shown in FIG. 1.
Figure 5A:
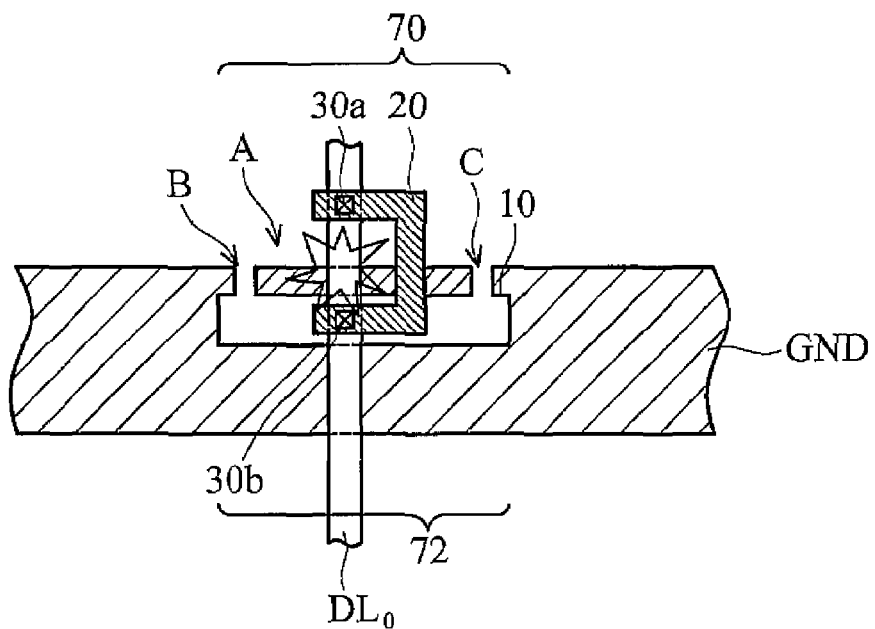
FIG. 5A illustrates a repairing method wherein a repair wire circumvents a defect.
Figure 5B:
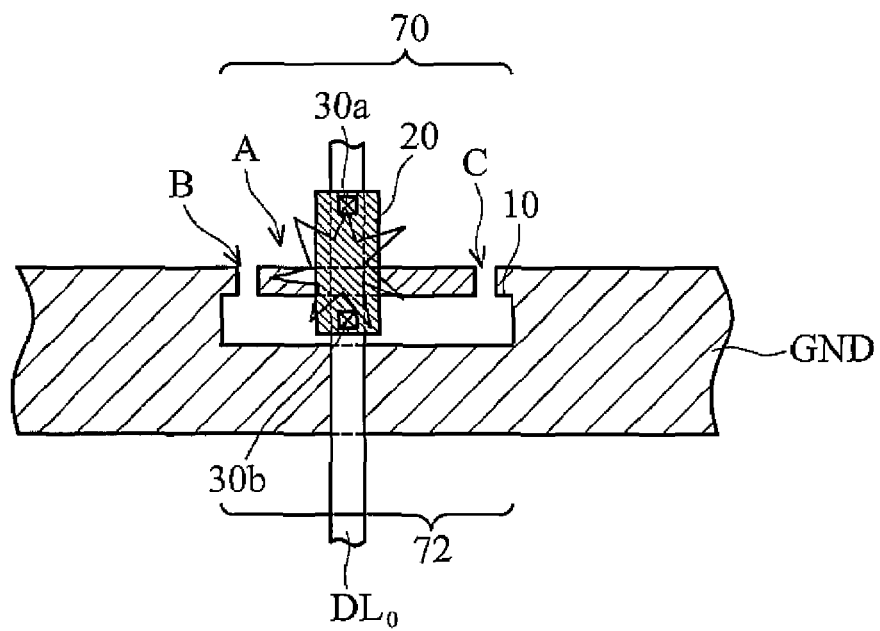
FIG. 5B illustrates a repairing method wherein a repair wire crosses a defect.

FIG. 4 shows a meltdown of data line $DL_0$ at the intersection and an open circuit formed at location A caused by ESD. In FIG. 4, the ground wire GND is located under the data line $DL_0$ and disconnected. The repairing method is illustrated in FIG. 5A or 5B. The method forms an additional repair wire 20 across the open circuit A to re-connect the data line $DL_0$. Generally, two contacts 30a and 30b across the defect A on the data line $DL_0$ are formed by a laser, i.e. contact windows 30a and 30b are formed in the dielectric layer on the data line $DL_0$. Subsequently, a repair wire 20 is formed by laser CVD. The repair wire 20 electrically contacts the data line $DL_0$ via contacts 30a and 30b. Since the use of a laser to form contacts 30a and 30b may result in melting between the two layers, locations of the contacts 30a and 30b should not overlap the ground wire GND. As shown in FIGS. 5A and 5B, the contact 30b corresponds to the opening 10 of the ground wire GND. The formed repair wire can circumvent the defect A, as shown in FIG. 5A or directly cross over the defect A, as shown in FIG. 5B. If the data line $DL_0$ should contact with the ground wire GND when it is broken, the repair can be accomplished by cutting the ends B and C of the electrostatic discharge triggering segment 70. Again, a laser can be utilized to cut a narrower electrostatic discharge triggering segment 70.

Figure 7:
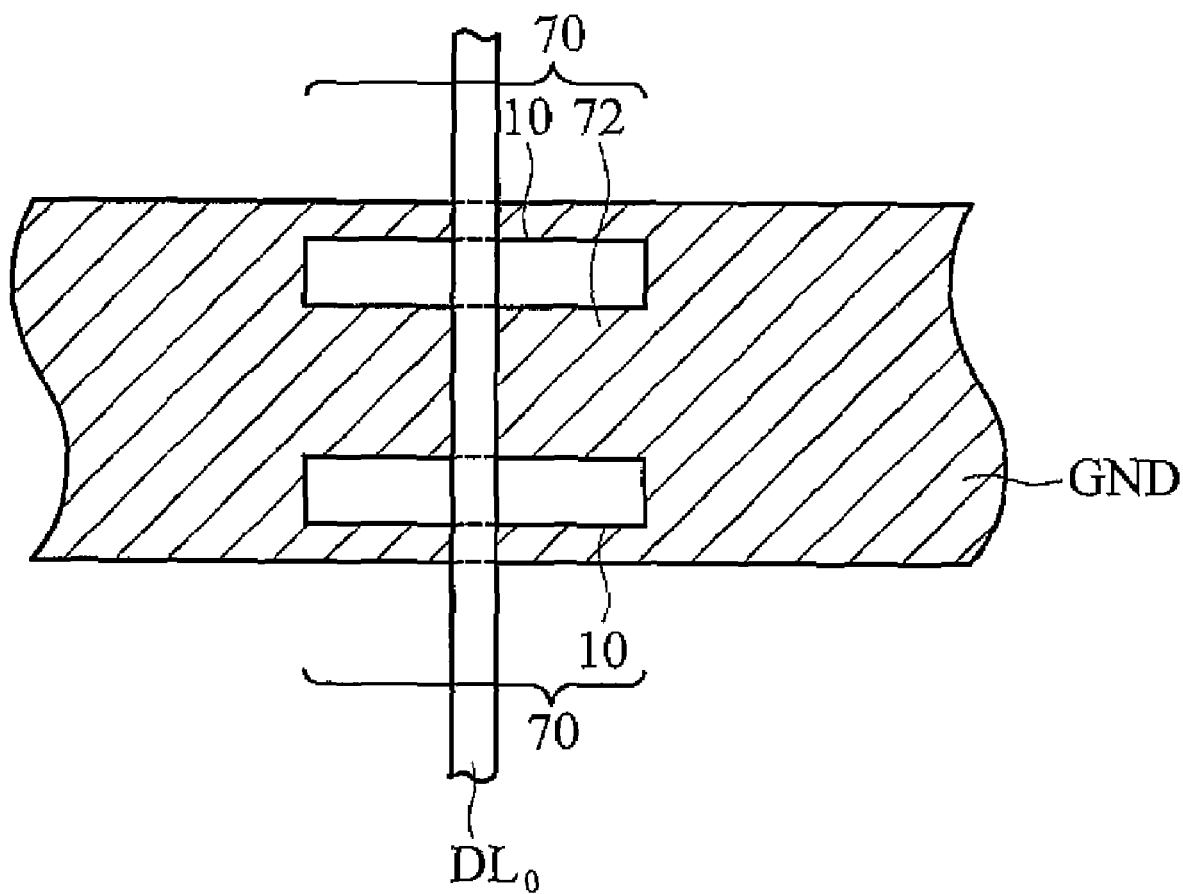
FIG. 7 illustrates an electrostatic discharge guide with two electrostatic discharge triggering segments.

Moreover, the number of the electrostatic discharge triggering segments of the ground wire intersecting the data line $DL_0$ can be one, two, or more. As shown in FIG. 7, if two electrostatic discharge triggering segments 70 and a main ground segment 72 are desired, two openings 10, perpendicular to the data line $DL_0$, in the ground wire GND at the intersection are required.

The present invention provides an electrostatic discharge guide, which directs ESD damage to occur at specific locations. Therefore, damage can be rapidly identified. Furthermore, the electrostatic discharge triggering segments simplify the repair process.

While the invention has been described by way of example and in terms of preferred embodiment, it is to be understood that the invention is not limited thereto. To the contrary, it is intended to cover various modifications and similar arrangements as would be apparent to those skilled in the Art. Therefore, the scope of the appended claims should be accorded the broadest interpretation so as to encompass all such modifications and similar arrangements.

What is claimed is:

1. An electrostatic discharge guide device comprising:
   a first data line;
   a second data line adjacent to the first data line; and
   a ground wire, comprising:
      at least one main ground segment, isolated from and intersecting the first data line;

at least one electrostatic discharge triggering segment, connected to the main ground segment, isolated from and intersecting the first data line; and an opening substantially surrounded by the main ground segment and the electrostatic discharge guide, intersecting the first data line, wherein the opening does not extend to the second data line.

2. The electrostatic discharge guide device of claim 1, wherein the electrostatic discharge triggering segment comprises two ends connected to the main ground segment.

3. The electrostatic discharge guide device of claim 1, wherein the electrostatic discharge triggering segment has a first line width narrower than a second line width of the main ground segment.

4. A liquid crystal display comprising an electrostatic discharge guide, the liquid crystal display further comprising:
   a substrate;
   a plurality of data lines, arranged substantially in parallel on the substrate; and
   at least one ground wire, isolated from and intersecting the data lines to form a plurality of intersecting regions; wherein in each intersecting region, the ground wire comprises:
   at least one main ground segment isolated from and intersecting a corresponding data line; and
   at least one ESD triggering segment, connected to the main ground segment, isolated from and intersecting the corresponding data line;
   an opening substantially surrounded by the main ground segment and the electrostatic discharge guide, intersecting the corresponding data line without extending to adjacent ones in the data lines.

5. The liquid crystal display of claim 4, wherein both ends of the electrostatic discharge triggering segment are connected with the main ground segment.

6. The liquid crystal display of claim 4, wherein the electrostatic discharge triggering segment has a first line width narrower than a second line width of the main ground segment.

7. The liquid crystal display of claim 4, wherein the ground wire is located between the substrate and each data line.

8. The liquid crystal display of claim 4, wherein each data line is located between the substrate and the ground wire.

* * * * *